United States Patent

[11] 3,599,142

| | | | | |
|---|---|---|---|---|
| [72] | Inventor | Stanley Rust<br>Seattle, Wash. | | |
| [21] | Appl. No | 828,677 | | |
| [22] | Filed | May 28, 1969 | | |
| [45] | Patented | Aug. 10, 1971 | | |
| [73] | Assignee | Honeywell, Inc.<br>Minneapolis, Minn. | | |

[54] CONTROL APPARATUS
12 Claims, 1 Drawing Fig.

[52] U.S. Cl. ............................................. 340/5 R,
   325/313, 325/477
[51] Int. Cl. ........................................... H04b 1/10
[50] Field of Search ................................. 340/3, 5, 6,
   16; 343/5 A, 5 F, 5 C, 7 R, 7 S, 17.1, 100.12;
   325/313, 477

[56] References Cited
UNITED STATES PATENTS
| | | | |
|---|---|---|---|
| 2,400,552 | 5/1946 | Hoover, Jr | 340/6 |
| 3,071,752 | 1/1963 | Strasberg | 340/5 |

Primary Examiner—Richard A. Farley
Attorneys—Charles J. Ungemach, Ronald T. Reiling and Charles L. Rubow ABSTRACT: A method and apparatus for providing subtraction of self-generated interference signals through the use of an interference sensor mounted on board a vessel receiving sonar signals. One or more phase lock loops are used to follow each particular self-generated frequency signal. The phase lock loops incorporate amplitude and phase scaling to account for the continual change in both amplitude and phase of a signal between the time of generation and the time of reception by a sonar receiver.

PATENTED AUG 10 1971
3,599,142
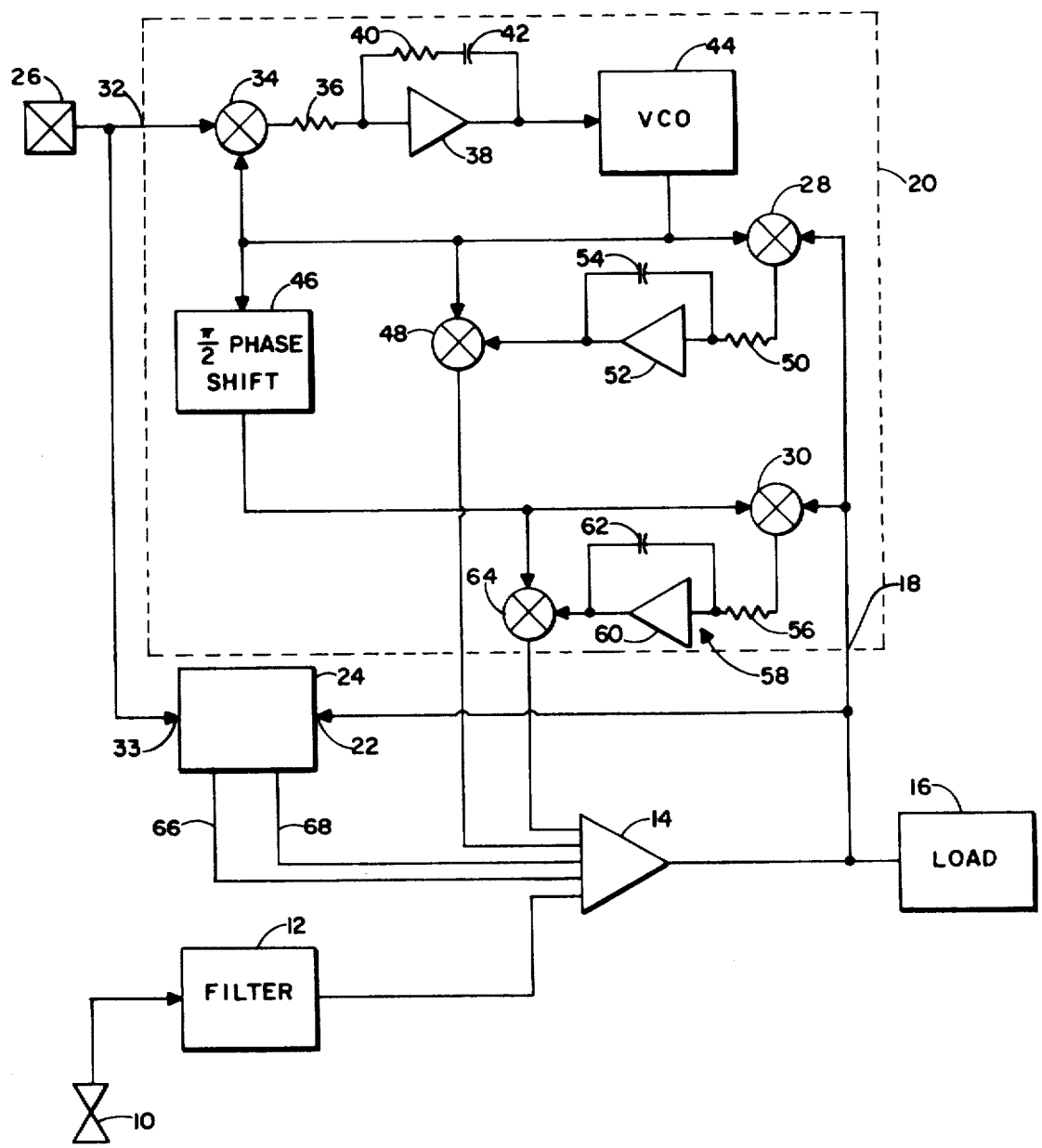
INVENTOR
STANLEY RUST
BY Bruce C Lutz
ATTORNEY

CONTROL APPARATUS

THE INVENTION

The present invention is generally directed to electronic equipment and more specifically directed toward improving the quality of received signals by removing interference or noise signals which are self-generated to provide improved signal-to-noise ratio.

It is known that self-generated noise causes interference with information signals, and that an interference sensor could be mounted on board a vessel to supply signals of the opposite phase to self-generated sonar signals to cancel such signals received by a hydrophone. However, no account has been taken of the fact that the self-generated interference signals tend to vary in phase and amplitude with time. Therefore, while these prior art systems sometimes worked after a fashion under an extremely limited set of environmental conditions, in general they did not operate satisfactorily. The present invention on the other hand provides one or more variable frequency phase lock loops which can follow each of one or more signals generated at different frequencies. The signals are tracked and then split into two quadrature phase signals of the same amplitude. These quadrature phase signals are then scaled in amplitude individually in accordance with corresponding phase components in the output signal from a summing amplifier. The scaled signals are then supplied to the input of the summing amplifier, which also receives the received sonar signal at another input, to effectively cancel any signal of the interference signal frequency from the output of the summing amplifier. In other words, the circuit operates as a feedback unit, although in a completely different feedback mode than is normally provided.

It is therefore an object of the present invention to provide improved signal reception wherein the signal-to-noise ratio is greatly improved by subtracting the self-generated signals.

Further objects and advantages of the present invention will be apparent from a reading of the specification and appended claims in conjunction with the single FIGURE of the drawing which shows a block diagram of one preferred embodiment of the present invention.

In the FIGURE, an acoustic receiver or hydrophone 10 supplies signals to a zonal filter or band-pass filter 12 which passes signals within a region of interest. The output from filter 12 supplies an input to a summing amplifier 14 having a plurality of other inputs. An output of amplifier 14 supplies an input to a load 16. The load 16 may be a line analysis load using phase lock analyzers or other similar equipment such as LOFAR (Low Frequency Acquisition and Ranging) apparatus. The output of summing amplifier 14 is also supplied to an input 18 of a dashed line subtraction block 20 and to an input 22 of a subtraction block 24. Both blocks 20 and 24 contain similar equipment or circuitry for following the frequency sensed by an interference, sensor 26. Both blocks also contain amplitude and phase scaling equipment as previously mentioned. Since both blocks 20 and 24 contain similar equipment, only the circuitry within block 20 is shown in detail. The input 18 of block 20 is supplied to two phase sensitive demodulators 28 and 30. Interference sensor 26, which may comprise a crystal accelerometer, supplies input signals at inputs 32 and 33 of blocks 20 and 24 respectively. The signal at input 32 is supplied to a phase detector or multiplier circuit 34 which supplies an output through a resistor 36 to an input of an amplifier 38. A resistor 40 and a capacitor 42 are connected in series from output to input of amplifier 38 to provide feedback. The output of amplifier 38 is also connected to an input of a voltage controlled oscillator or VCO 44. An output of VCO 44 is supplied as a second input to demodulator 28, as a second input to multiplier 34, and as an input to a 90° or π/2 phase shift circuit 46. The output of VCO 44 is also supplied to a further phase detector or multiplier circuit 48.

An output from demodulator 28 is supplied through a resistor 50 to an input of an amplifier 52 having a capacitor 54 connected to provide feedback from output to input. The capacitor 54 in combination with amplifier 52 provides an integrator. The output from amplifier 52 is supplied as a further input to multiplier 48. An output from phase shift circuit 46 is supplied as a further input to demodulator 30. An output from demodulator 30 is supplied through a resistor 56 to an input of an integrator 58 comprising an amplifier 60 and a capacitor 62 in the manner described above for amplifier 52 and capacitor 54. An output of integrator 58 is supplied as an input to a phase detector or multiplying circuit 64 which has a further input from phase shift circuit 46. Outputs from multipliers 48 and 64 are supplied as further inputs to summing amplifier 14. The subtraction circuit 24 also has two outputs shown as lines 66 and 68 which supply further inputs to summing amplifier 14.

In operation, most vessels utilizing sonar receivers will tend to generate signals in the form of interference due to motors and other vibration generating equipment on board the vessel. These signals will be received by the hydrophone 10 as it is receiving other types of information signals such as similar noises generated on board other vessels. These signals are all supplied through a filter 12 to filter out some of the extraneous signals. However, since the frequencies of the signals generated by other ships in the region of interest are similar to the frequencies of those signals generated by the listening vessel, a considerable number of self-generated interference signals will be supplied through the filter 12 to the summing amplifier 14 and load 16. Thus, the sensor 26 is utilized on board the vessel to pick up any self-generated interference signals. Sensor 26 would be much more sensitive to any vibrations occurring on the vessel than it would be to signals flowing through the environment, such as water, and striking the vessel. These self-generated interference signals, which may be of more than one frequency, are supplied to subtraction circuits. One such subtraction circuit is block 20. Within block 20 the multiplier 34 in combination with amplifier 38 and VCO 44 form a phase lock loop which can follow a given input frequency signal over a range limited by the control of the VCO 44. The VCO 44 will, of course, run at some frequency with no bias input. The output from multiplier 34 includes a direct voltage signal component indicative of the difference in frequency or phase between the output of 44 and the input from 32. This output is then used in the integrating circuit or low pass filter formed by amplifier 38 and the resistor-capacitor combination 40 and 42 to supply an input to VCO 44 to cause its operating frequency to correspond to one of the frequencies supplied by interference sensor 26. In this way a signal is generated at the output of 44 which is of exactly the same frequency as one of those sensed by interference sensor 26. This signal is of constant amplitude. The constant amplitude feature enables the rest of the circuitry to more easily control the amplitude of the input signals at summing amplifier 14.

In addition, the VCO 44 insures that only one frequency signal will be acted upon at a given time. In other words, the phase lock loop acts as a very selective filter and allows the passage of only one frequency component of the plurality of applied input signals. In order to prevent the various subtraction networks such as 20 and 24 from locking on to the same frequency, the VCO's such as 44 are biased or designed so that they will oscillate at different frequencies in a quiescent or no input signal condition. The output from VCO 44 is also applied to multiplier 48 and to demodulator 28. The demodulator 28 is phase sensitive and thus provides an output which is indicative of the difference in phase between the two inputs. This difference in phase is reflected in the input to the integrator formed by amplifier 52 and capacitor 54 whose output is used to adjust multiplier 48 which adjusts the amplitude of the signal from VCO 44. The adjusted amplitude signal is then supplied to an input of amplifier 14.

Since the phase shifter 46 supplies an output signal which is in quadrature with the input supplied to demodulator 28 VCO 44, the demodulator 30 will provide an output which is indicative of the difference in phase between the input received from phase shifter 46 and a signal received from summing amplifier 14. The output from the phase sensitive demodulator 30 is thus indicative of the amplitude of a quadrature component of the given frequency signal, in contrast to the output from demodulator 28 which is indicative of an inphase component. This signal is applied to integrator 58 to adjust the amplitude of the signal from phase shifter 46 before it is applied to an input of summing amplifier 14.

The VCO in block 24 (corresponding to VCO 44) is biased to cause block 24 to operate on a different frequency component of the interference signal than that operated on by block 20. Block 24 provides signals to summing amplifier 14 which are acted on in the same manner as the signals from block 20.

As is known to those skilled in the art, the adjustment in amplitude of two quadrature phase signals can be utilized to produce a resultant signal of any phase within a 90° spread of a reference frequency. If the quadrature signals can; vary in polarity as well as amplitude, the phase of the resultant signal can vary within a 360° range. Thus, by using two quadrature components of a self-generated interference signal at a given frequency, the feedback signals as generated by VCO 44 can be adjusted as to their quadrature components to produce a resultant signal which is of the amplitude and phase necessary to completely cancel the interference signal of that frequency received by hydrophone 10.

With the subtraction of all the interference signals, the only signals left are spurious noise signals which can be removed by the line analysis equipment, and the information signals due to other vessels in the area. The line analysis equipment can then process these various frequency signals to provide an indication of the type of vessel generating the signals.

While the present invention has been described in conjunction with sonar, there is no reason why it cannot be used in other environmental conditions. Further, the equipment need not be used only on a waterborne vessel but can also be used on a solid station such as a bottom mounted oil drilling rig, etc.

It is therefore believed that the invention has many areas of usefulness and should be limited only by the scope of the appended claims wherein I claim.

1. Apparatus including sonar signal receiving means on board a vessel which itself is the source of interference signals, the apparatus incorporating means for receiving compensating input signals prior to the apparatus output for the purpose of reducing the amplitude of the components of the apparatus output signal arising from the interference signals, the improvement comprising, in combination:
  vibration sensing means mounted on board the vessel for sensing at least one interference signal of a given frequency; and
  means connecting said vibration sensing means to said sonar signal receiving means for passing only the interference signal of said given frequency and applying it as a compensating input signal which is continuously adjusted both in phase and amplitude in response to the phase and amplitude of the sensed interference signal so as to substantially reduce the amplitude of the component of the apparatus output signal resulting from the interference signal.

2. Apparatus as claimed in claim 1 wherein said means connecting said vibration sensing means to said sonar receiving means includes a variable frequency band-pass filter and two phase sensitive detectors operating in quadrature for supplying quadrature input signals which are adjusted in amplitude to effectively produce the compensating input signal which is phase and amplitude adjusted as a function of time.

3. Apparatus for reducing the amplitude of self-generated interference in signals received at a signal processing station utilizing a receiver which supplies received information signals plus received interference signals, through a summing amplifier having a plurality of inputs, to an information signal output, said apparatus comprising, in combination:
  interference signal sensor means connected to said station for supplying as an output at least one signal of a given frequency;
  first means including a narrow band-pass filter connected to said sensor means for receiving signals therefrom and providing as output signals first inphase and first quadrature output signals corresponding in frequency to the signal received from said sensor means;
  first feedback means connected to said apparatus output, an input of the summing, and said first means for providing a second inphase output signal, of the frequency of said first inphase signal, and indicative in amplitude of a first phase component in the received interference signals, which is of a phase to cancel the first phase component in the received interference signals and of the frequency of said second inphase signal; and
  second feedback means connected to said apparatus output, an input of the summing amplifier and said first means for providing a second quadrature output signal in quadrature with said second inphase signal, of the frequency of said first quadrature output signal, and indicative in amplitude of a second phase component in the received interference signal, which is of a phase to cancel the phase component in the received interference signal which is in quadrature with the first phase component and of the frequency of said second quadrature output signal.

4. Apparatus as claimed in claim 3 wherein said narrow band-pass filter has a variable center frequency.

5. Apparatus as claimed in claim 3 wherein said filter comprises a phase lock loop which will follow variations in the given frequency.

6. Apparatus as claimed in claim 3 wherein said first inphase and first quadrature phase output signals are maintained at a substantially constant amplitude.

7. Apparatus as claimed in claim 3 wherein said first and second feedback means each comprise a phase sensitive demodulator, an integrator and a signal amplitude adjuster for comparing the amplitude of a given phase component of a given frequency interference signal with a reference, integrating the difference, and adjusting the output signal in accordance with the integrated difference.

8. The method of reducing the effect of interference signals received relative to the effect of information signals received on board a vessel utilizing a receiver supplying received signals to an apparatus output comprising the steps of:
  detecting signals generated on board the vessel;
  isolating a first single frequency component from those signals detected on the vessel;
  isolating a second component of the same frequency as the first component from those signals appearing at the apparatus output;
  adjusting the amplitude and phase of the first isolated frequency component in accordance with the second isolated frequency component; and
  combining the adjusted frequency components with the received interference and information signals prior to the apparatus output to reduce the amplitude of the second isolated frequency component appearing at the apparatus output.

9. The method of claim 8 comprising the additional step of dividing the first isolated component into quadrature signals which are individually adjusted in accordance with the second isolated component to produce effectively a variable phase feedback signal to be combined with the received signals.

10. Apparatus for reducing the amplitude of self-generated sonar interference signals received by a sonar transducer on a vessel comprising, in combination:
  a sonar transducer;
  a receiver including a band-pass filter connected to receive signals from said sonar transducer and providing an output first signal comprising both information and interference signal components;

summing means, including a plurality of input means, connected to said receiver for receiving the output first signal therefrom and including an output means for providing an output second signal;

interference signal sensing means mounted on said vessel for providing an output third signal indicative of frequency components generated internal to the vessel;

self-noise interference subtraction means connected to said interference sensing means and to said output means of said summing means for receiving interference signals of a given interference frequency and providing output fourth and fifth signals of said given frequency, which signals are in phase quadrature and individually vary in amplitude in accordance with their respective opposite phase components as received by said subtraction means from said output means of said summing means; and means connecting said output means of said subtraction means to said input means of said summing means for supplying said fourth and fifth signals thereto.

11. Apparatus as claimed in claim 10 comprising in addition a separate subtraction means for each of the interference frequency components generated on the vessel wherein each subtraction means receives input signals from the same source and supplies output signals to said input means of said summing means.

12. Apparatus as claimed in claim 10 wherein said subtraction means includes;

a phase lock loop for receiving input signals from said interference sensor and providing said output fourth and fifth signals of quadrature phase;

a first scaling circuit for comparing the output second signal of a given frequency and of a phase component opposite the phase of said output fourth signal to a reference in a first phase sensitive demodulator and integrating the output for adjusting the amplitude of said fourth signal; and a second scaling circuit for comparing the output second signal of a given frequency and of a phase component opposite the phase of said output fifth signal to a reference in a second phase sensitive demodulator and integrating the output for adjusting the amplitude of said fifth signal.